United States Patent [19]

De Micheli

[11] 4,185,189

[45] Jan. 22, 1980

[54] SIGNAL DETECTOR FOR MONITORING ELECTRIC CIRCUITS OF A TELECOMMUNICATION SYSTEM

[75] Inventor: Spiridione De Micheli, Turin, Italy

[73] Assignee: Cselt - Centro Studi e Laboratori Telecomunicazioni S.p.A., Turin, Italy

[21] Appl. No.: 769,270

[22] Filed: Feb. 11, 1977

[30] Foreign Application Priority Data

Feb. 13, 1976 [IT] Italy ............................ 67326 A/76

[51] Int. Cl.² ............................................. G06F 11/00
[52] U.S. Cl. .................................... 235/304; 364/900
[58] Field of Search ............... 235/302, 304, 307, 301; 365/201; 364/900

[56] References Cited

U.S. PATENT DOCUMENTS

| | | | |
|---|---|---|---|
| 3,122,725 | 2/1964 | Felton et al. | 235/307 |
| 3,177,468 | 4/1965 | Ruoff | 235/307 |
| 3,492,645 | 1/1970 | Aridas | 235/307 |
| 3,771,131 | 11/1973 | Ling | 235/304 |

*Primary Examiner*—Charles E. Atkinson
*Attorney, Agent, or Firm*—Karl F. Ross

[57] ABSTRACT

A signal detector monitoring the presence or absence of line currents in a multiplicity of circuits of a telecommunication system includes an orthogonal matrix MN of magnetic-core sensors divided into (m+1) rows and (n+1) columns. The cores of the first m rows and first n columns constitute active sensors provided with respective writing conductors extending from m·n monitored circuits. A duplicated first set of wires 1A, 1B, each coacting with the cores of one row, are successively energized with interrogation and resetting currents in the course of a scanning cycle; a duplicated second set of wires 2A, 2B, each coacting with the cores of one column, terminate at respective sense amplifiers AS which read the states of the interrogated cores and load the detected responses into a buffer register RPP from which they are serially read out to a processor DU. The duplicated first wires 1A, 1B are energized in alternate cycles by respective scanners IR in two control sections CMA, CMB which also include the corresponding sense amplifiers AS; each control section further comprises a checking network CC including two test units CAS, CIR respectively designed to ascertain possible malfunctions of the associated sense amplifiers AS and of the associated scanner IR. Test unit CAS is enabled at the end of each scanning cycle to receive the output signals of the amplifiers appearing upon the interrogation and the subsequent resetting of the cores of the $(m+1)^{th}$ row whereas unit CIR is enabled during flow of interrogation current in each row-scanning interval to receive the output signal of the last amplifier $AS(n+1)$ representing the response of the $(n+1)^{th}$ core of each row, all these cores constituting passive sensors devoid of writing conductors. The results of the checks carried out by the test units are fed to the processor during the time interval allocated to the scanning of the $(m+1)^{th}$ row.

10 Claims, 6 Drawing Figures

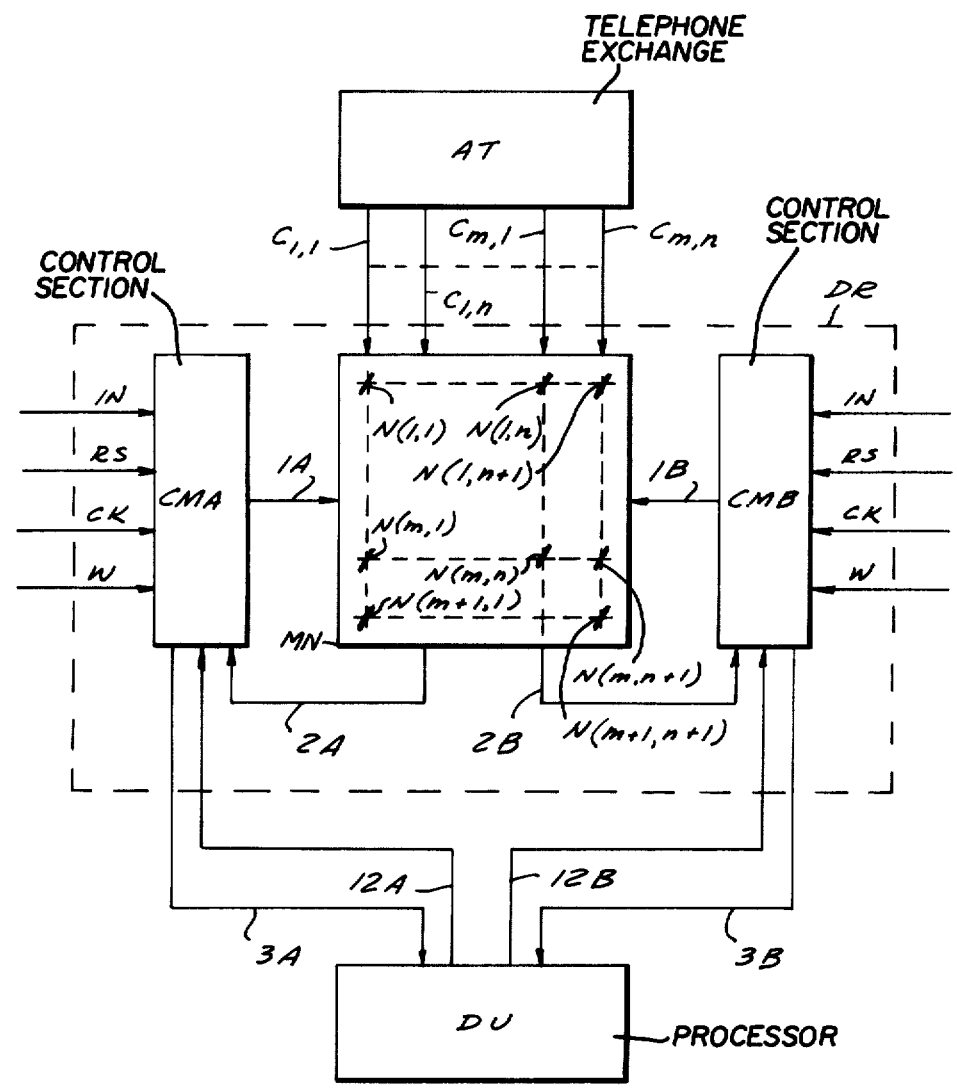
FIG. 1
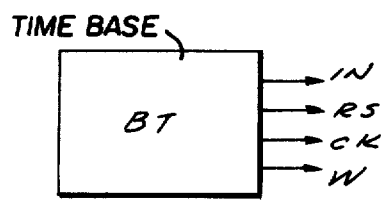

SIGNAL DETECTOR FOR MONITORING ELECTRIC CIRCUITS OF A TELECOMMUNICATION SYSTEM

FIELD OF THE INVENTION

My present invention relates to circuit arrangements for the detection and storage of data indicated by the presence or absence of direct currents, more particularly to a device for monitoring the state of conduction of electric signaling circuits employed in telecommunication systems.

BACKGROUND OF THE INVENTION

In modern telecommunication systems where it is required that documentation, checking or charging operations be carried out automatically, the need arises to detect data which are expressed by the presence or absence of direct currents on particular circuits and to supply such data to a load such as, for instance, an electronic computer.

For a proper evaluation of these data it is first of all necessary that incoming direct currents, lacking mutual electrical correlation in most instances, be converted by the detecting device into outgoing signals related to a given reference voltage without regard to the electric state of the various circuits to be examined.

Further, these outgoing signals must be at a level compatible with that required for the operation of logic circuits of computing system.

Finally, it is indispensable that in the event of failure no detecting device should affect the normal operation of a telecommunication network.

To solve those problems, use has been made of detecting devices that employ, as sensors for the presence or absence of current, magnetic cores with rectangular hysteresis loops traversed by conductors which carry the signal currents to be detected (writing windings) and are connected to units designed to perform interrogation operations and to restore the initial state of such cores, i.e. to zeroize or reset them, upon each interrogation.

As compared with other systems for criteria detection, those based on the use of cores offer the guarantee of a low sensitivity to electric disturbances present on the circuits to be examined and a high electric decoupling between reading and writing circuits, thus obviating any interference, even in the event of failure, with the normal operation of the controlled network. Additionally, the use of cores makes it possible to modify in a simple way the threshold value of the current to be sensed.

Further, it has now become the practice, in particular where criteria have to be detected from a large number of circuits, to arrange such cores in groups in the form of matrices on common supports and to read them by means of time-sharing techniques. An arrangement of this kind allows great simplification of the circuitry of the detecting device.

Core matrices known in the art are provided with duplicated logic devices for reading and writing operations and include self-diagnostic units which employ groups of cores not connected to the circuits from which criteria are derived, i.e. cores without writing windings.

In these matrices, however, duplication has been accomplished in such a way that only one of the two unit groups of the duplicated device will be operating, whereas the other is constantly kept as a standby and will intervene only in the event of failure of the first group.

This entails the severe drawback of rendering an on-line checking of standby devices impossible, and as a consequence these devices may be unable to accomplish their task when required to intervene because of a failure of the main chain. In this situation all data collected by the detecting device obviously get lost and this may result not only in a hindrance to the normal management of a telecommunication network but also in serious economic losses for the operating administration when such data relate to accounting operations.

Another shortcoming of this sort of device is inherent in the procedure of checking the operation of the chain of devices being used; to state whether troubles have to be ascribed to interrogation devices or reading devices, use must be made of several horizontal and/or vertical rows of cores without reading windings.

It is therefore obvious that the detection of malfunctioning devices can be performed only to the detriment of the data-collection capacity of detecting devices, whose number must consequently be increased, which in turn gives rise to space problems in such areas as telephone exchanges where there is already a high density of equipment.

A further disadvantage of conventional core matrices is due to the fact that there are no tools offering a protection against failures which, occurring in only one or two components of duplicated testing units, make is automatically impossible for the other components of that unit to operate, as when for instance a scanning circuit goes on sending interrogation current to a row or column of the matrix; in this situation, a switchover to the standby unit would cause several rows or columns to be simultaneously interrogated and therefore the detected signal samples would not correspond to the actual situation.

OBJECT OF THE INVENTION

The object of my present invention, accordingly, is to provide an improved signal detector of the type referred to which is free from the aforementioned drawbacks.

SUMMARY OF THE INVENTION

Such a detector, pursuant to my present invention, comprises an orthogonal matrix of active and passive sensors of the magnetic-core type, with rectangular hysteresis loops, divided into a multiplicity of rows and columns, more specifically (m+1) rows and (n+1) columns for the monitoring of m·n signaling circuits. Two substantially identical control sections each include a scanner having outgoing leads which coact with the sensors of respective rows for transmitting interrogation and resetting currents to the sensors of each row during respective time intervals (referred to hereinafter as row times) of a recurrent scanning cycle. Each control section further includes amplifiers having incoming leads which coact with the sensors of respective column for reading the states of these sensors, i.e. their sense of magnetization, in the presence of an interrogation current. The amplifiers deliver information signals, indicative of the states of the interrogated active sensors as detected in each scanning cycle, to a processor designed to evaluate the responses of these sensors which have writing conductors connected to respective signaling circuits to be monitored. During the interrogation of passive sensors devoid of such writing conductors, their responses are transmitted to test means in each control section, the test means of both control sections emitting supervisory signals which are transmitted to the processor in lieu of information signals during a portion of each cycle in which no active sensors of the matrix are being interrogated. The enablement of the test means during interrogation of passive sensors as well as the switchover between information and supervisory signals is controlled by a time base also serving to enable the respective scanning means of the first and second control sections during alternate cycles. Thus, during normal operation, the control sections alternate in transmitting interrogation and resetting currents to the matrix cores for a full scanning cycle.

According to a more particular feature of my invention, and as more fully described hereinafter, the test means of each control section comprises two separate test units enabled at different instants by the time base. The first unit is enabled during the phase reserved for the interrogation and resetting of one row occupied only by passive sensors, specifically the $(m+1)^{th}$ row, in order to make a comparison among binary output signals from all the amplifiers, an unsuccessful comparison giving rise to an error signal emitted by this unit. The second unit is connected only to the amplifier of one column occupied exclusively by passive sensors, specifically the $(n+1)^{th}$ column, in order to compare the output signal of that amplifier with a predetermined signal level during each row time, emitting an error signal in the event of an unsuccessful comparison. For reasons to be explained, however, I prefer to provide the second test unit with a blocking input connected to an output of the first test unit for inhibiting the emission of an error signal by the second unit in the presence of an error signal from the first unit.

Pursuant to a further feature of my invention, each control section comprises a pair of switching circuits with a multiplicity of wire pairs which form part of its outgoing leads at opposite ends of each row, the switching circuits being concurrently operable by the time base to establish a flow path for interrogation current in one direction, including one wire of each pair at opposite ends of any row being scanned, and to establish a flow path for resetting current in the other direction, including the other wire of each pair at the opposite ends of such a row. In an advantageous arrangement, the rows are divided into a multiplicity of groups and each wire pair of one switching circuit of either control section has parallel branches traversing all the rows of a respective group, each wire pair of the other switching circuit being connected in parallel to the branches traversing homologous rows of all groups. The branches are electrically separated from one another by decoupling means such as diodes inserted between them and the associated wire pairs.

BRIEF DESCRIPTION OF THE DRAWING

The above and other features of my present invention will now be described in detail with reference to the accompanying drawing in which:

FIG. 1 is an overall block diagram showing a signal detector according to my invention connected between a telecommunication apparatus and a processor utilizing data outgoing from that detector;

SPECIFIC DESCRIPTION

Figure 2:
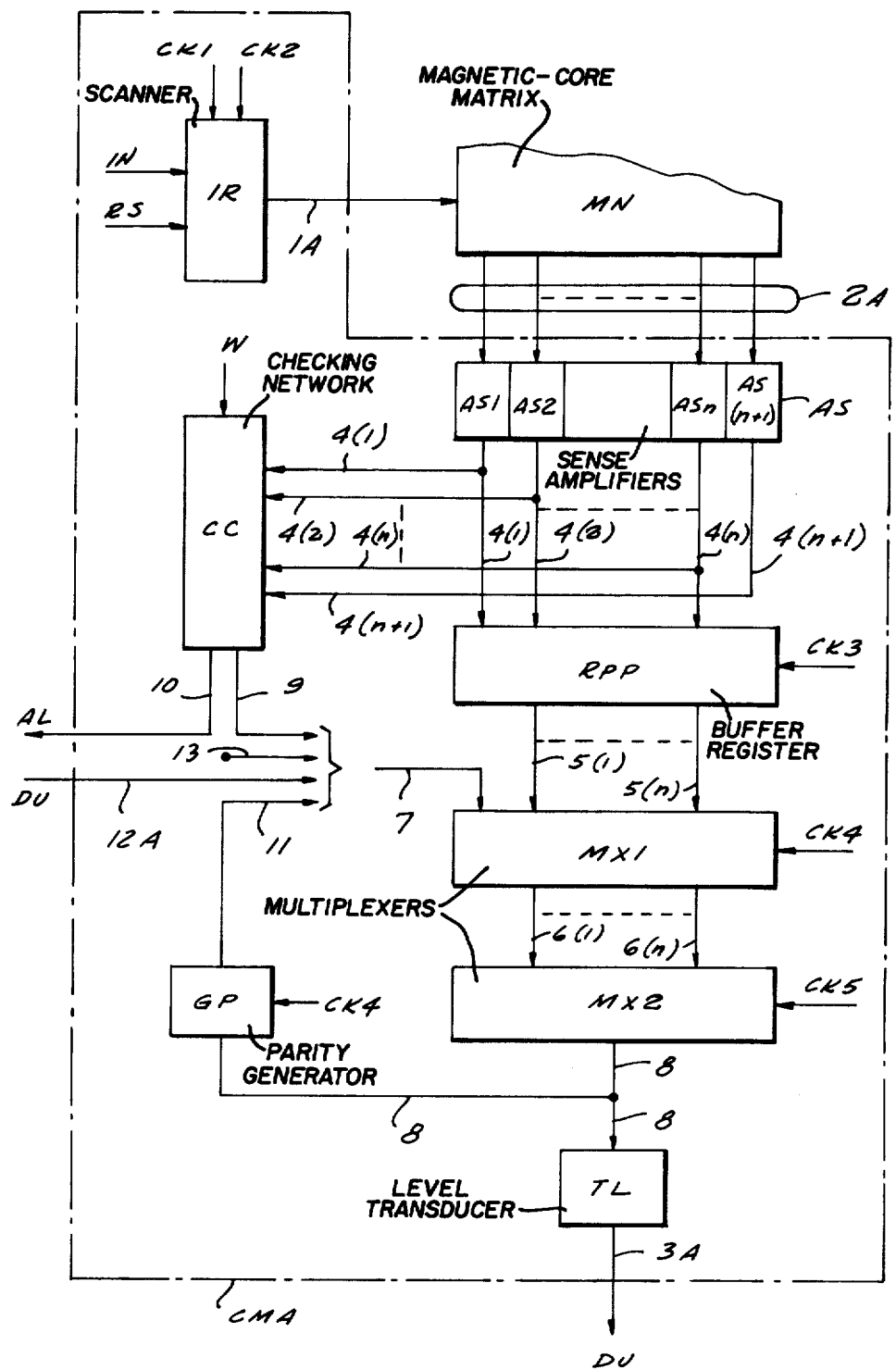
FIG. 2 is a block diagram showing details of a control section generally designated CMA in FIG. 1.

As shown in FIG. 1, reference AT denotes a generic apparatus including electric circuits, connected to conductors $C_{1,1} \ldots C_{1,n} \ldots C_{m,1} \ldots C_{m,n}$, wherein the presence or absence of a direct current must be detected. Apparatus AT may consist, for instance, of the equipment of a telephone exchange, and in this case currents flowing in conductors $C_{1,1} \ldots C_{m,n}$ will represent, for example, information concerning the number of telephone calls, the number of charge pulses, and the like.

Reference characters $N(1,1) \ldots N(1,n)$, $N(1,n+1), \ldots N(m,1), \ldots N(m,n)$, $N(m,n+1)$, $N(m+1,1), \ldots N(m+1,n)$, $N(m+1,n+1)$ indicate an orthogonal array of magnetic cores with rectangular hysteresis loops, so arranged as to form a matrix MN consisting of $m+1$ rows and $n+1$ columns. The first of the parenthetical postscripts of each of these reference characters indicates the row of the respective magnetic core whereas the second one indicates its column.

In the matrix, cores belonging to the first m rows and to the first n columns are active sensors having writing windings respectively formed by the conductors $C_{1,1} \ldots C_{m,n}$ which carry the signal levels to be detected; the cores belonging to the remaining rows and columns are passive sensors designed for checking and self-diagnosis operations, as will be explained hereinafter.

Figure 3:
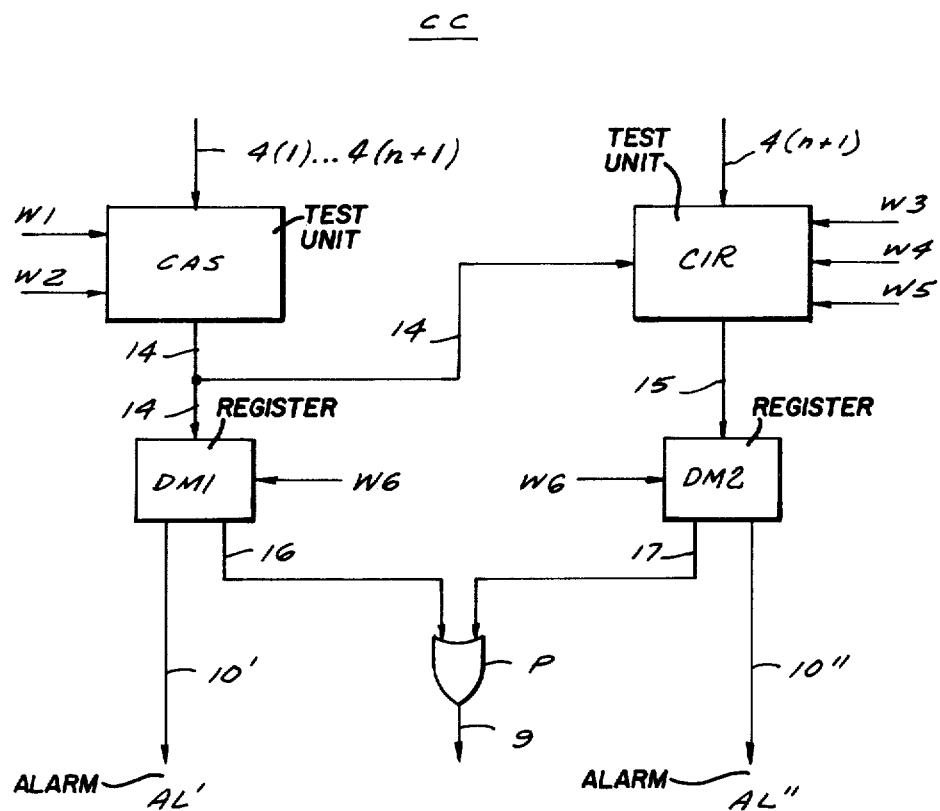
FIG. 3 is a diagram of a checking network designated CC in FIG. 2.
Figure 5:
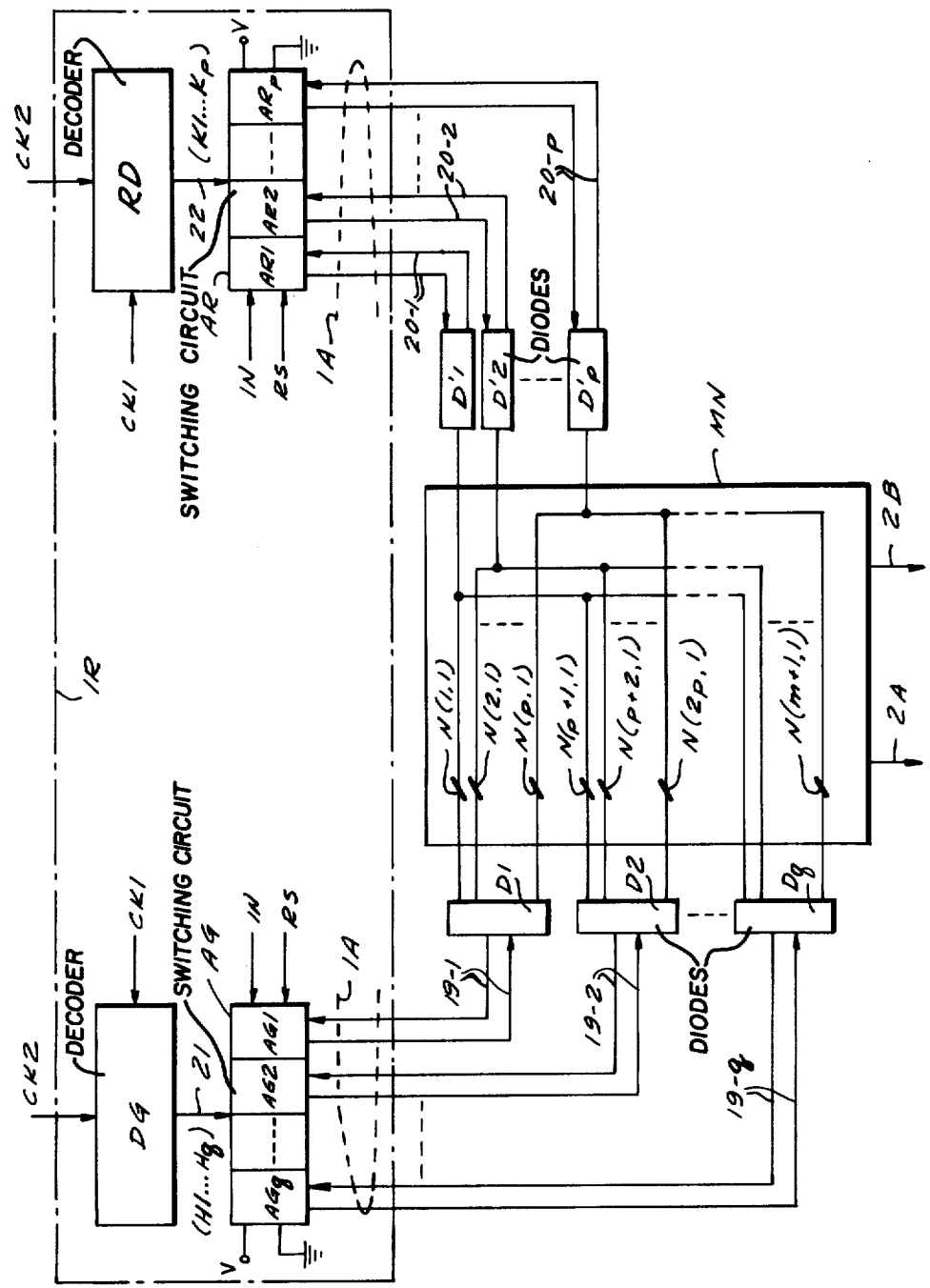
FIG. 5 is a diagram showing a preferred embodiment of a scanner designated IR in FIG. 2.

References CMA, CMB denote two identical control sections whose structure will become more apparent from FIGS. 2, 3 and 5, forming duplicated drivers for interrogating and reading the matrix cores.

More particularly, sections CMA, CMB send into cores N interrogation and resetting currents over outgoing leads collectively represented by respective links 1A, 1B. In particular, for simplicity's sake, it will be assumed hereinafter that interrogation and resetting, as well as reading, occur cyclically and sequentially, row by row. It is obvious that this assumption does not limit the overall scope of my invention.

Further sections CMA, CMB receive over a link 2A or 2B, respectively, the signals coming from the cores in response to the interrogation; they emit over a wire 3A or 3B, respectively, serialized samples of the received responses and send out alarm signals in the event of malfunctions.

The emission of interrogation and resetting currents is controlled by means of command signals, respectively indicated by IN and RS, whose shape will be described later on with reference to FIG. 4; the reading and serializing of responses from cores N is timed by a group of clock signals, generally indicated by CK, whereas the checking operations for the correct functioning are timed by a further group of signals generally indicated by W. These signals are generated by circuitry shown in FIGS. 2 and 3, and their shape will be described later on with reference to FIG. 4. For the moment, I just want to point out that the timing is such that the interrogation and resetting currents are emitted in one scanning cycle of the matrix MN by section CMA and in the subsequent cycle by section CMB, whereas in each scanning cycle the responses from cores are simultaneously collected by sections CMA and CMB.

Further, for simplicity's sake, FIG. 1 does not show the actual connections of cores N to the writing conductors $C_{1,1} \ldots C_{m,n}$ and to interrogation and reading wires forming the links 1A, 1B, and 2A, 2B, inasmuch as these details are well known to persons skilled in the art.

For the purpose of this invention it is sufficient to note that each core N is crossed by two interrogation wires, respectively belonging to links 1A and 1B, and by two reading wires, respectively belonging to links 2A and 2B.

Components MN, CMA, CMB jointly constitute the signal detector according to my invention, indicated by the block DR.

A conventional processor DU receives serialized signal samples read out by detector DR over links 3A and 3B, to evaluate them, and sends to sections CMA, CMB, over links 12A, 12B, instructions for checking the transmission in progress.

A time base BT serves for generating the signals IN, RS, CK, W which are required for the operation of control sections CMA, CMB.

In FIG. 2 I have shown details of control section CMA which, of course, is also representative of section CMB.

An interrogation circuit or scanner IR, responsive to signals IN and RS, cyclically and sequentially transmits to the several rows of matrix MN, over link 1A, interrogation and resetting currents.

The operations of scanner IR are timed by two clock signals CK1, CK2 originating from time base BT (FIG. 1); signal CK1 activates scanner IR during alternate cycles whereas signal CK2 sets the time for exploring the individual core rows of matrix MN.

The structure of scanner IR will be discussed more particularly with reference to FIG. 5.

A set of amplifiers AS1, AS2, . . . ASn, AS(n+1), generally designated AS, receives in parallel from matrix MN, over the n+1 incoming leads to link 2A, the response signals emitted by all the cores of the individual rows, according to the order in which the rows are interrogated, and brings these signals to a level compatible with that which is required for the operation of the logic networks following them. Amplifier assembly AS block signals emitted by the cores in response to the resetting current.

Each individual amplifier AS1, AS2, . . . ASn, AS(n+1) is connected to a wire of link 2A and designed to receive sequentially, row by row, the signal emitted by the core belonging to the column with the same index.

Elements AS1 . . . AS(n+1) are of a type known in the art as "sense amplifiers".

A conventional parallel/parallel buffer register RPP receives the responses from the cores connected to conductors $C_{1,1} \ldots C_{m,n}$ (FIG. 1), present on outgoing wires 4(1) . . . 4(n) of amplifiers AS, and retains these responses on its outputs 5(1) . . . 5(n) as long as this is required for the operations of transmitting them to the processor DU. The signals present on outputs 5(1) . . . 5(n) may be referred to as "information signals".

The timing of these operations is determined by a clock signal CK3, coming from the time base BT (FIG. 1).

A multiplexer MX1 (FIG. 2) transfers in parallel, over output wires 6(1) . . . 6(n), either information signals coming from register RPP through wires 5(1) . . . 5(n) or test signals reaching the multiplexer on a second input connected to a link 7, having 7 wires, which in turn collects the signals present on wires 9, 11 and on links 12A, 13. The binary signals present on wires 9 and 11 are self-diagnosis and parity signals, respectively; the signals present on link 12A, coming from processor DU, carry for instance information relevant to possible synchronism defects of time base BT, as may be required in special situations. On the other hand the wires of link 13 carry definite logic signals, to be used by processor DU for transmission-quality checks.

Multiplexer MX1 is positioned on its inputs connected to wires 5(1) . . . 5(n) as long as scanner IR is sending interrogation currents and resetting currents to the cores connected to circuits $C_{1,1} \ldots C_{m,n}$, namely for the time period required by the scanner to interrogate the first m rows of the matrix MN; the multiplexer is positioned on its inputs connected to the wires of link 7 during the time interval required for interrogating and reading the $(m+1)^{th}$ row which, as already mentioned, serves for checking and self-diagnosis operations.

The order for positioning multiplexer MX1 on either group of inputs is given by a clock signal CK4 from time base BT (FIG. 1).

Another conventional multiplexer MX2 serves to serialize the signals reaching it in parallel over input wires 6(1) . . . 6(n) and to emit over a wire 8 the serialized signals. The timing for these operations is determined by a clock signal CK5 from time base BT (FIG. 1).

A conventional level transducer TL receives the signals supplied by multiplexer MX2 over wire 8 and bring them to a level suitable for transmission to the processor DU, depending on the nature and length of link 3A.

A network CC comprises the circuits required for the execution of checking and self-diagnosis operations.

In response to timing signals W, network CC is able to receive through wires 4(1), 4(2) . . . 4(n), 4(n+1) the signals emitted by amplifiers AS1, AS2 . . . ASn, AS(n+1), to identify from such signals possible malfunctions, to detect whether these malfunctions are caused either by amplifiers AS1 . . . AS(n+1) or by scanner IR, and to generate a supervisory signal indicative of the result of the effected check. This supervisory signal is conveyed to the second input of multiplexer MX1 through a wire 9 and link 7, and to an external alarm device AL through a link 10.

The structure of network CC will be described in more detail with reference to FIG. 3, which shows also the individual waveforms constituting signal W.

A conventional parity generator GP serves to calculate, e.g. during the time assigned to the treatment of the $(m+1)^{th}$ row of the matrix, the parity of the information signals outgoing from multiplexor MX2, which are supplied to it through wire 8, and to send a bit indicative of this parity to the second input of multiplexer MX1 through a wire 11 and link 7.

The timing for these operations is provided by the same clock signal CK4 which controls multiplexer MX1.

Figure 4:
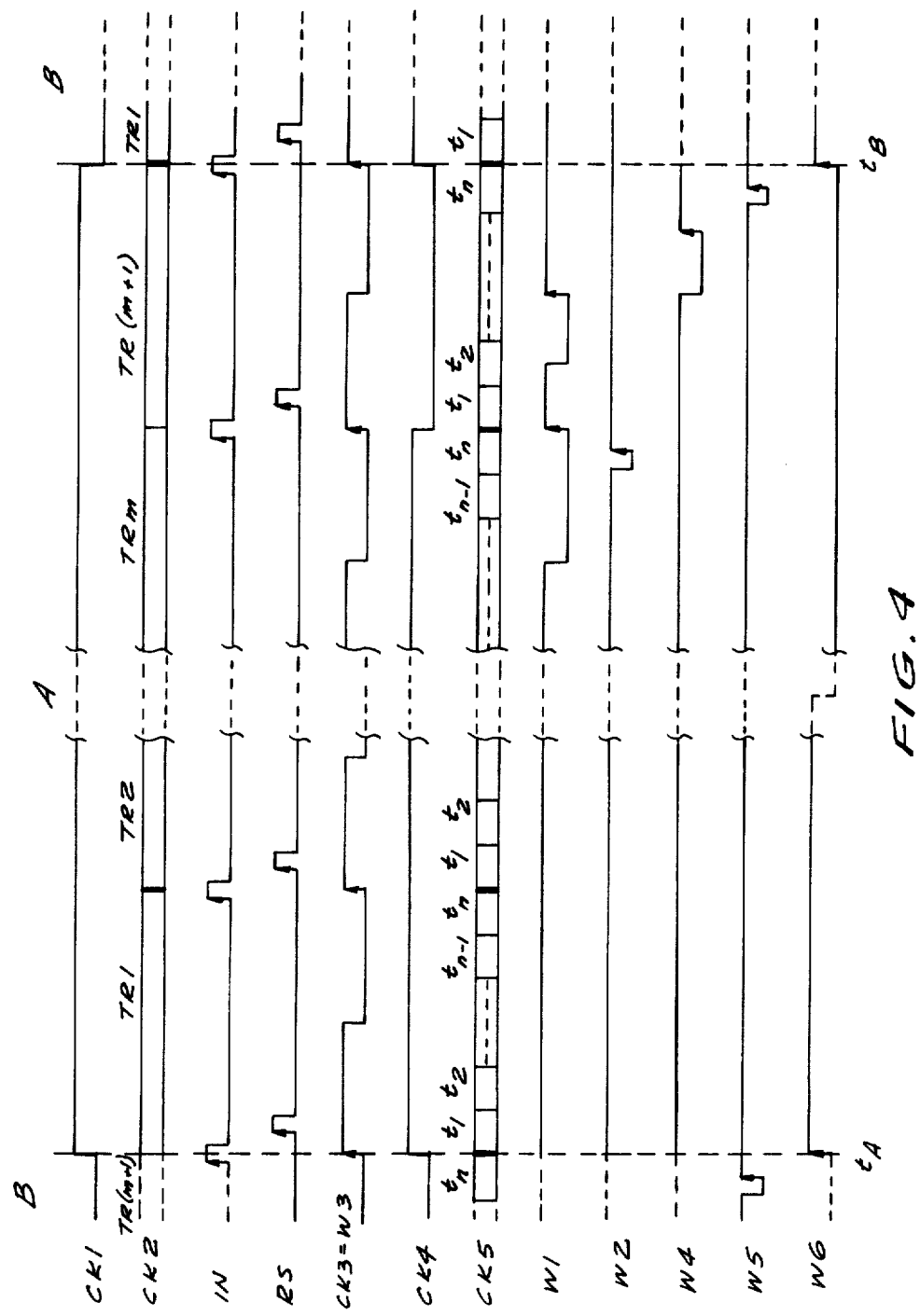
FIG. 4 is a set of graphs showing the signals required for the operation of the circuits shown in FIGS. 2 and 3.

In FIG. 4 there are depicted the shapes of signals CK1–CK5 which time the operations of circuits IR, AS, RPP, MX1, MX2 and GP and form the clock signals denoted by CK in FIG. 1 and of the signals IN and RS already mentioned.

Signal CK1, which causes the alternate operation of the scanners IR of control sections CMA and CMB, is a square wave of period equal to two scanning cycles of matrix MN (FIGS. 1, 2); one half of its period is at logic level 1 and the other at logic level 0. By way of example, it will be assumed that during the semiperiod or scanning cycle A, in which signal CK1 has logic value 1, scanner IR belonging to section CMA is enabled, whereas during the other semiperiod or scanning cycle B (shown only partially) the corresponding scanner of section CMB is enabled. At $t_A$ and $t_B$ I have indicated the starting instants of a cycle A and of the subsequent cycle B, i.e. a point of transition from 0 to 1 of signal CK1 and the subsequent point of transition from 1 to 0 of the same signal.

Signal CK2, which starts the scanning of the various rows of cores, is made up of a group of waveforms which, upon suitable decoding, supply the addresses for these rows. The shape of these waves is of no interest for the purpose of this invention; references TR1, TR2 . . . TRm, TR(m+1) denote the time intervals (row times) designed for the handling of rows 1, 2 . . . m, m+1.

Signal IN consists of a set of pulses of very short duration with respect to a row time, with a cadence equal to the row-scanning rate, that have not been drawn to scale; the emission of the interrogation current is controlled by the positive front of each pulse. The Figure shows the leading edge of signal CK1 (instant $t_A$) which is slightly delayed with respect to the leading edge of the corresponding pulse of signal IN; this is to symbolize the fact, which is characteristic of core sensors, that the significant instant for detecting the state of the core is delayed with respect to the starting instant of the interrogation current. For the sake of brevity and easy representation, however, I have shown the starting instant of each cycle and, consequently, the starting instant of each row time as coincident with the instant of detection and have correspondingly advanced the pulses of signal IN. The extent of this advance has only been approximated in FIG. 4.

Signal RS has a shape quite similar to that of signal IN; its pulses, which control with their leading edges the transmission of resetting current to the individual rows, appear delayed with respect to the start of the row time by a time interval (also indicated only approximately) sufficient to ensure that the pulse of the core response is ended.

Signal CK3 is a square wave, of period equal to the row time, which changes from logic value 0 to logic value 1 in coincidence with the beginning of each row time, and is kept at 1 for a certain interval which, for simplicity's sake, is represented as equal to half the row time. With each passage from 0 to 1, signal CK3 causes the loading in register RPP (FIG. 2) of the data present at that instant on wires 4(1) . . . 4(n).

Signal CK4 controlling multiplexer MX1 (FIG. 2) is a rectangular waveform changing from logic level 0 to level 1 at the beginning of each matrix-scanning cycle; it remains at 1 till the end of time TRm, when it changes to level 0 where it remains during the whole row time TR(m+1). Multiplexer MX1 is positioned on inputs 5(1) . . . 5(n) as long as clock signal CK4 is at 1, and is positioned on the input connected to link 7 when signal CK4 is at 0; additionally, during the time in which signal CK4 is at 0, parity generator GP is enabled.

Wave CK5 (FIG. 4) is the signal determining the scanning of the n inputs of multiplexer MX2 for the serial transfer of data to processor DU and has therefore a period equal to a row time. Its real shape is of no interest for the purpose of this invention and therefore I have merely indicated in FIG. 4 the time intervals $t_1$, $t_2$ . . . $t_n$ respectively allocated to these inputs, the intervals assigned to the first m rows of the matrix representing the time required for the interrogation of the cores equipped with a writing wire.

In FIG. 3 I have shown at CAS a unit included in network CC whose task is to check the correct operation of sense amplifiers AS1 . . . AS(n+1) by ascertaining, during the time interval TR(m+1) of FIG. 4 required for the scanning of the last row, whether these amplifiers emit, over wires 4(1) . . . 4(n+1), a signal having the proper logic level both when the cores of that row receive an interrogation current and when they are not excited. Test unit CAS emits on a wire 14 an outgoing signal of one logical level or the other according to whether or not this check has detected malfunctions.

For the sake of simplifying the description, this output signal will be assumed hereinafter to be a logic 0 in case of regular operation and a logic 1 in the event of a malfunction.

To accomplish these operations, unit CAS receives a control signal W1 and a clearing signal W2, which belong to group W (FIGS. 1, 2) and will be described subsequently with reference to FIG. 4.

Another test unit CIR ascertains the correct operation of scanner IR (FIG. 2); unit CIR (FIG. 3) receives during each row time over wire 4(n+1) the responses from the cores not equipped with writing wires which form part of the $(n+1)^{th}$ column of matrix MN, checks whether these responses have the same logic value, and interrupts the comparisons as soon as a response different from the previous ones appears. After the time interval designed for receiving the response from the last core of the last row, test unit CIR transmits a signal of one logic value or the other, according to whether or not a malfunction of the monitored component IR has been detected.

Also in this case it will be assumed that the output signal is a 0 if scanner IR operates correctly and a 1 if a malfunction of some kind has been detected.

Furthermore, test unit CIR receives over wire 14 the output signal of test unit CAS and is thereby disabled if the latter signal is at level 1, i.e. if unit CAS has detected a malfunction of one of the amplifiers AS (FIG. 2).

The disablement of the test unit CIR monitoring the scanner IR, when a failure in the amplifying assembly AS is detected, takes into account the fact that on the one hand the signaling of a failure in assembly AS does not specify to which individual amplifier this failure must be ascribed and, on the other hand, failures of scanner IR manifest themselves as errors in the output signal of amplifier AS(n+1).

Therefore a simultaneous emission of a malfunction indication by both units CAS and CIR would not necessarily mean that this failure concerns the scanner IR (FIGS. 2), but could simply refer to a malfunction of amplifier AS(n+1).

Considering that an uncorrected failure of amplifier assembly AS will entail the loss of data read by the detector DR, and in order to obviate checking operations on a correctly operating component, I prefer to give priority to checks on the amplifiers AS and to disable the test unit CIR whenever unit CAS signals an anomalous condition.

To start operating, unit CIR must receive a first timing signal W3, which causes the loading of the responses of the cores of the $(n+1)^{th}$ column, a second timing signal W4 which enables the emission of the output signal, and a clearing signal W5. These timing signals, which too belong to group W, will be dealt with later on with reference to FIG. 4.

Two identical registers DM1, DM2 (FIG. 3) store for several consecutive scanning cycles (e.g. two cycles) the output signal of unit CAS or CIR, respectively, and emit on respective wires 16 and 17 a supervisory signal whose logic level indicates whether a malfunction has appeared in each of these consecutive cycles.

Also in this case it has been assumed that a logic 0 is present on wires 16, 17 as long as there are no malfunctions recurring in all the consecutive cycles under examination; otherwise the signal on these wires is a logic 1.

Signals outgoing from registers DM1, DM2 are also sent over wires 10′, 10″ to alarm devices AL, AL″ which indicate a failure concerning component AS or IR (FIG. 2) when for instance a logic 1 is present on these wires.

The wires 10′, 10″ are part of the connection 10 of FIG. 2 leading to the alarm indicator AL.

Registers DM1, DM2 (FIG. 3) are controlled by a timing signal W6, which will be described with reference to FIG. 4.

An OR gate P (FIG. 3), upon receiving at its inputs over wires 16, 17 the signals outgoing from registers DM1, DM2, transmits over wire 9 a signal which, when received by multiplexer MX1 (FIG. 2) over link 7, will provide the processor DU with data on the operation of the matrix.

Under the foregoing assumptions, such a signal is a logic 0 as long as there is no malfunction signal from test unit CAS or CIR (FIG. 3) in several consecutive cycles.

I shall now describe, with reference to FIG. 4, the shape of signals W1–W6 required for the operation of checking network CC.

Signal W1 is a rectangular wave, of period equal to a scanning cycle, which has a first transition from 0 to 1 in coincidence with the beginning of the row time $TR(m+1)$, in order to allow unit CAS (FIG. 3) to check the operation of amplifiers AS1 ... $AS(n+1)$ (FIG. 2) in the presence of interrogation current, and a second transition from 0 to 1 at an instant which is so delayed with respect to the first one that the amplifiers can be checked in their steady state. Thus, for example, the instant of the second transition may occur in the middle of the row time $TR(m+1)$ (FIG. 4).

The instants of transition from 1 to 0 are not relevant to the operation of unit CAS (FIG. 3) and are chosen only with a view to an easier generation of signal W1. By way of example, the drawing shows that, after its second transition to 1, signal W1 is maintained at that level for the remaining part of interval $TR(m+1)$ and for the subsequent cycle up to an instant slightly preceding the start of the row time $TR(m+1)$.

Timing signal W2 is also a wave of period equal to a matrix-scanning cycle and has a transition from 0 to 1 at an instant immediately preceding the start of interval $TR(m+1)$; as a consequence of this transition, signal W2 causes the clearing of unit CAS. Also in this case the transition from 1 to 0 does not affect the operation of unit CAS, and the instant at which this transition occurs will be set, as already explained, with a view to the easy generation and/or stability of the signal. By way of example, the drawing shows that signal W2 remains at 1 during the whole cycle, except for a short interval preceding its significant transition. The time interval during which signal W2 is at 0 is therefore immaterial.

Signal W3, which causes the reception by unit CIR (FIG. 3) of the responses of the last core of each row, has a period equal to a row time and is coincident with signal CK3 (FIG. 4) which controls the loading of data into register RPP (FIG. 2). Signal W4, enabling the transmission of the output signal of unit CIR (FIG. 3), is a wave of period equal to a matrix-scanning cycle and has a transition from 0 to 1 during the row time $TR(m+1)$ (FIG. 4), at an instant which is so delayed, with respect to the second transition to 1 of signal W1, as to allow the execution of the second check by unit CAS (FIG. 3) and the arrival of any disabling signal over wire 14.

What has been stated for waves W1, W2 about the signal shape before and after the transition from 0 to 1 applies also to wave W4.

Signal W5 is a wave having a shape similar to signal W2, except for the fact that, since unit CIR must operate during the entire scanning cycle and not only during row time $TR(m+1)$, the transition to 1 takes place shortly before the start of each cycle. Signal W6, timing the operation of registers DM1 and DM2 (FIG. 3), has also a rectangular shape of period equal to the duration of a scanning cycle and a transition from 0 to 1 (FIG. 4) in coincidence with the start of each scanning cycle. Such a transition controls the sending to gate P (FIG. 3) of a supervisory signal indicative of recurrent failure; this malfunction signal, as already explained, is transmitted by multiplexer MX1 (FIG. 2) during the row time $TR(m+1)$ (FIG. 4).

The mode of operation of checking network CC is as follows:

Let us consider, by way of example, cycle A (FIG. 4). Starting from instant $t_A$ at the beginning of the cycle, and subsequently during all row times, test unit CIR (FIG. 3) loads the response of the last core of the last scanned row upon the arrival of the positive front of signal W3. Since, as already said, the last core of each row is not equipped with a writing winding, all their responses must have the same logic value and, as an example, it may be assumed that, if the operations of scanner IR (FIG. 2) and amplifier $AS(n+1)$ are correct, a bit of logic value 1 is present on wire $4(n+1)$.

Unit CIR (FIG. 3) keeps loading the responses arriving on wire $4(n+1)$ as long as these have logic value 1 and, after detecting a 0, disregards the subsequent response signals till the end of the cycle when it is cleared by signal W5.

It will now be assumed that the operation of scanner IR (FIG. 2) is correct and therefore unit CIR (FIG. 3) keeps loading the core responses.

Unit CIR does not send out any signals giving information about the state of scanner IR (FIG. 2), inasmuch as it is necessary to wait for the checks carried out by unit CAS (FIG. 3) in order to ascertain whether the nonarrival of a response over wire $4(n+1)$ must be actually ascribed to a malfunction of scanner IR (FIG. 2) or has been caused by a failure of the amplifier $AS(n+1)$ assigned to the last core column.

During the time interval from TR1 to TRm (FIG. 4), unit CAS (FIG. 3) remains disabled by signal W1; immediately before the start of row-scanning interval TR(m+1), unit CAS is cleared and then made ready for operation in the last row time by the transition to 1 of signal W2.

At the start of interval TR(m+1) the first transition to 1 of signal W1 enables unit CAS to check the operation of amplifiers AS1 ... AS(n+1) (FIG. 2) in the presence of the interrogation current.

This check, utilizing the cores of the (m+1)$^{th}$ row which are not equipped with writing windings, must cause, if amplifiers AS are operating normally, the same responses for all cores of the row; also in this case it is assumed that, if operation is correct, a logic 1 is present on wires 4(1) ... 4(n+1). About midway in interval TR(m+1), thus at an instant far enough from the times at which interrogation and resetting currents are emitted in order to ensure that the effects of such currents have abated, the second transition to 1 of signal W1 (FIG. 4) enables unit CAS (FIG. 3) to check the operation of amplifiers AS1 ... AS(n+1) (FIG. 2) in the steady state of the cores; in this stage, if operation is correct, a logic 0 must be present on all wires 4. If unit CAS (FIG. 3) has found that all amplifiers AS1 ... AS(n+1) (FIG. 2) are correctly operating in both states, it will emit on output wire 14 a logic 0. When the positive front of signal W4 appears, unit CIR can then transmit over wire 15 its output signal which will also be a logic 0 as a correct operation of circuit IR (FIG. 2) is assumed. Subsequently, unit CIR is cleared by the positive front of signal W5 (FIG. 4).

The logic levels 0 present on leads 14 and 15 (FIG. 3) are loaded into registers DM1 and DM2, which upon the arrival of the positive front of signal W6 (FIG. 4) transmit over wires 16 and 17 (FIG. 3) a logic 0 to OR gate P on whose output 9 a 0 will be present.

The case will be now examined where test units CAS and/or CIR detect a malfunction in the checked circuit.

A failure concerning one of the amplifiers AS1 ... AS(n+1) (FIG. 2) is detected, as discussed above, by checking during the last row time whether the output signal of these amplifiers is a logic 1 for all of them when the cores receive an interrogation current, and that there is a logic 0 when the cores are in a state of rest. As a consequence of a failure it may therefore happen that a logic 0 is present on one of wires 4(1) .. . 4(n+1) after the first test, or a logic 1 after the second test. Upon receiving at one of its inputs, after one or the other transition to 1 of signal W1 (FIG. 4), a response different from that present at its other inputs, unit CAS (FIG. 3) transmits over wire 14 (FIG. 3) an error signal in the form of a logic 1 which is stored in register DM1, e.g. during two consecutive cycles, and at the same time disables the test unit CIR.

If this logic 1 is the first failure signal reaching the register DM1, the latter still transmits over wire 16 a logic 0 to gate P; as unit CIR is disabled by the logic 1 present on wire 14, its output 15 and, consequently, the output 17 of register DM2 will also carry a 0 so that the output of gate P remains at 0. If during time TR(m+1) (FIG. 4) of the next cycle, after the clearing performed by signal W2, the checks carried out by unit CAS (FIG. 3) indicate that the state of amplifiers AS1 ... AS(n+1) (FIG. 2) has become normal, there is again a 0 on wire 14 (FIG. 3) so that unit CIR can resume its checking operations; register DM1 finds that the new test signal indicates a normal condition and emits a 0. Since it is assumed that scanner IR (FIG. 2) functions properly, operations of network CC resume normally. If, on the contrary, unit CAS (FIG. 3) still detects a malfunction in the responses of amplifiers AS1 ... AS(n+1) (FIG. 2), it transmits on lead 14 (FIG. 3) a malfunction signal which still keeps unit CIR disabled and is recognized by register DM1 as a second consecutive error signal sent out by unit CAS. As it is assumed that register DM1 indicates the presence of such a failure after a malfunction indication appears in two consecutive scanning cycles of matrix MN (FIG. 1), a logic 1 will now be present on wire 16 (FIG. 3), which passes through gate P on wire 9 and apprises processor DU (FIG. 1) of the failure; at the same time over wire 10' (FIG. 3) a signal will be sent which causes alarm device AL, associated with assembly AS (FIG. 2), to be operated. The operation of network CC in the event of a failure in scanner IR only is quite similar: if unit CIR (FIG. 3) detects a difference among the responses coming from the cores of the (n+1)$^{th}$ column, reception of signals from wire 4(n+1) is stopped and the result of the tests carried out by unit CAS, which is sent to unit CIR along wire 14, is awaited. If the failure affects only the scanner IR and therefore no error signals are coming from unit CAS at the instant at which signal W4 changes from 0 to 1, a logic 1 is transmitted over wire 15, which is stored by register DM2 as an error signal for two consecutive cycles. After the first cycle, at the instant defined by the transition to 1 of signal W6, register DM2 transmits again over wire 17 a logic 0. After the second cycle, if the failure in scanner IR is not removed, wire 15 still carries an error signal giving rise to a logic 1 on output lead 17 of register DM2 and, consequently, on output lead 9 of gate P. At the same time there is present on wire 10'' an operating command for alarm device AL'' associated with scanner IR (FIG. 2).

However, a condition of failure simultaneously present in components AS and IR is not signaled as such, since the logic 1 sent out in this case by unit CAS (FIG. 3) to unit CIR over wire 14 prevents the transmission of an error signal by unit CIR on wire 15; only later on, after unit CAS has ascertained the restoration of the normal operating condition of the amplifiers AS (FIG. 2), the existence of a failure in scanner IR can be signaled.

As will be apparent from the foregoing description, test unit CAS comprises logical coincidence circuitry which, upon being turned on by a positive-going wavefront of enabling signal W1, compares the signal levels on all its input leads 4(1) through 4(n+1) and, in the event of a signal disparity, activates a signal source connected to output lead 14 to emit the error signal until the next occurrence of clearing signal W2. Test unit CIR, which merely checks whether the output current of amplifier AS(n+1) is of the proper magnitude in the last phase of each row-sampling period TR1—TR(m+1), requires only a simple logic gate which discriminates between the two possible signal levels and in response to the wrong level trips another signal source which, however, does not energize the output lead 15 until the arrival of a positive-going wavefront of enabling signal W4, provided that there is no blocking signal on lead 14. Such logical circuitry is, of course, well within the ken of persons skilled in the art.

In FIG. 5, reference MN denotes again the core matrix in which, for the purposes set forth in the following description, the interrogation and resetting wires are grouped in such a way that the p wires of each group are multiplied at one end to a respective wire pair 19-1, 19-2 ... 19-q and that the other ends of the wires having the same position in the several groups are multiplied to respective wire pairs 20-1, 20-2 . . . 20-p. These interrogation and resetting wires can therefore be regarded as parallel branches of associated wire pairs.

A conventional decoder DG, upon receiving the row-addressing signal CK2, emits on a link 21 during alternate cycles a series of signals H1, H2 . . . Hq, equal in number to the q groups of rows of the matrix, which sequentially and cyclically render these groups receptive to the interrogation and resetting currents. Decoder DG is enabled by signal CK1 to operate in those alternate cycles.

Figure 6:
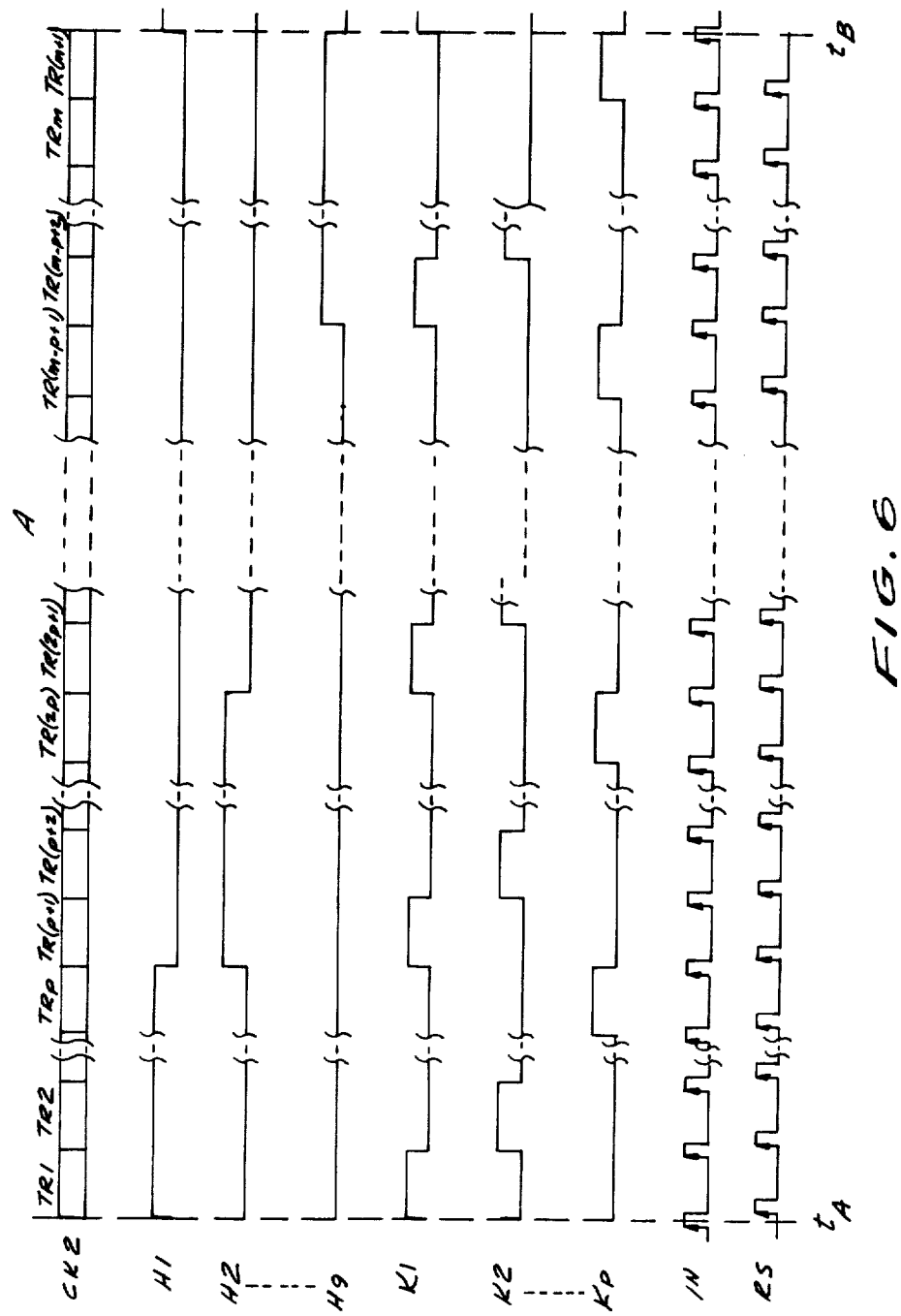
FIG. 6 is a set of graphs showing the signals required for the operation of the scanner shown in FIG. 5.

As shown in FIG. 6, signals H1 . . . Hq consist of mutually staggered rectangular waves whose period is equal to the duration of a matrix-scanning cycle; each wave has a logic value 1 for p row times during which it renders receptive the corresponding group of rows, whereas it has a logic value 0 for the remaining scanning period. More particularly, signal H1 is at 1 for the row times from TR1 to TRp; signal H2 is at 1 for the row times from TR(p+1) to Tr(2p), and so on, up to signal Hp, which is at 1 for the last p row times of each cycle, from TR(m−p+2) to TR(m+1).

A switching circuit AG (FIG. 5) is subdivided into a plurality of sections AG1, AG2, . . . AGq equal in number to the q groups of rows of the matrix; each of these switching sections connects, in response to signals IN or RS respectively, one wire or the other of the associated pair 19-1, 19-2, . . . 19-q to a power supply V or to ground.

Sections AG1, AG2, . . . AGq of switching circuit AG are cyclically and sequentially enabled by signals H1, H2, . . . Hq.

Blocks D1, D2, . . . Dq denote groups of diodes, inserted between the interrogation wires of the different groups and the corresponding pairs of wires 19-1, 19-2, . . . 19-q, which have the task of establishing the electrical connection between the interrogation wires and either wire of the pair, depending on whether interrogation current or resetting current is to flow; during the time in which no current must flow, these groups of diodes have the task of separating the groups of interrogation wires and the interrogation wires of each group.

Another conventional decoder RD is enabled to operate during alternate cycles concurrently with decoder DG by means of signal CK1; upon reception of row-addressing signal CK2, decoder RD emits on a link 22 a series of signals K1, K2, . . . Kp, equal in number to the p rows of each group, which sequentially and cyclically render the several sets of homologous rows of all groups receptive to interrogation and resetting currents.

As may be seen in FIG. 6, signals K1, K2, . . . Kp are relatively staggered rectangular waves of period equal to p row times; each of them has a logic value 1 for one of these p row times, during which it renders receptive the corresponding row of each group, whereas it has a logic value 0 for the remaining part of its period.

More particularly, signal K1 is at 1 during row times TR1, TR(p+1) . . . ; signal K2 is at 1 during row times TR2, TR(p+2) . . . , and so on up to signal Kp, which is at 1 during row times TRp, TR(2p), . . . TR(m+1).

Another switching circuit AR (FIG. 5) is subdivided into a plurality of sections AR1, AR2, . . . ARp equal in number to the p rows of each group; each of these switching sections connects, in response to signals IN or RS respectively, one wire or the other of the respective pair 20-1, 20-2, . . . 20-p to power supply V or to ground.

Sections AR1, AR2, . . . ARp are cyclically and sequentially enabled by signals K1, K2, . . . Kp respectively.

Blocks D′1, D′2, . . . D′p represent groups of diodes, similar to groups D1, D2, . . . Dq, having the task of distributing interrogation and resetting currents over one or the other wire of each pair 20-1, 20-2, . . . 20-p.

The operating procedure of the scanner IR shown in FIG. 5, with particular reference to cycle A, is as follows:

At instant $t_A$ (FIG. 6), which marks the start of the cycle, signals H1 and K1 change to 1 simultaneously, thus enabling section AG1 (FIG. 5) of switching circuit AG and section AR1 of switching circuit AR. They therefore make it possible for the matrix rows connected to the pair of wires 19-1 (first group of rows) and those connected to the pair of wires 20-1 (first row of each group) to receive the interrogation or resetting currents. The positive front of the first pulse of signal IN connects to the power supply V a wire of the pair 19-1 and to ground the corresponding wire of the pair 20-1; the circuit for the flow of the interrogation current is therefore closed only for the first row of cores which can receive that current as long as signal IN remains at 1. during this time the diodes of groups D1, D2, . . . Dq prevent such a current from flowing into the other wires of the group of into the other groups through common points.

Upon the reception of the positive front of signal RS the second wire of pair 19-1 is grounded and the second wire of pair 20-1 is connected to the power supply V; thus, as long as signal RS remains at 1, the resetting current can flow in a direction opposite to the previous one.

At the beginning of row times TR2, TR3, . . . TRp (FIG. 6), while signal H1 remains at 1, signals K2, K3, . . . Kp change successively to 1 so that the interrogation of the cores of the second row, third row . . . up to the $p^{th}$ row of the first group is made possible.

At the start of row time TR(p+1) signal H2 changes to 1, thus enabling section AG2 (FIG. 5) of switching circuit AG; signals K1 . . . Kp change again to 1 sequentially, thus successively enabling switching sections AR1 . . . ARp and in this way the cores of the rows of the second group are interrogated.

The same operations are repeated for the other groups of rows up to the $q^{th}$ group.

An arrangement of this type eliminates the possibility that, in consequence of a failure during the scanning cycle in which the interrogation circuit IR (FIG. 2) of one of the two control sections CMA, CMB is activated, an interrogation or resetting current is present originating from the companion circuit in the other section which in that same cycle is disabled by signal CK1.

In fact, the flow of interrogation or resetting current on any one row requires the concurrent enabling, through a signal H and a signal K (FIG. 5), of both a section of circuit AG and a section of circuit AR.

If, however, the enabling condition is effective only on one switching section in circuit AG or AR, the current path composed of a wire 19 and a wire 20 will not be electrically closed and therefore no interrogation or resetting current can flow.

The separation of the elements of the interrogation circuit or scanner IR (FIG. 2) into two parts which must be contemporaneously enabled can also be obtained without the grouping of the core rows shown in FIG. 5. In this case the circuits AG and AR would each include as many sections as there are core rows, and signals H and K would be equal in number to these rows.

Compared with the arrangement shown in FIG. 5, this modification would entail a more complicated circuitry of the scanner IR.

I shall now describe, with reference to the drawing, the overall mode of operation of the detector according to my invention. This description will be restricted to a single cycle, i.e. cycle A, since the operations relative to cycle B are perfectly identical with those those carried out in cycle A.

Further, since the first m rows of the matrix are mutually identical, I shall refer to only one of them, specifically the first one, and then consider the $(m+1)^{th}$ row used for checking operations.

Immediately before instant $t_A$ marking the start of the cycle (as stated in conjunction with FIG. A), scanner IR (FIG. 2) of control section CMA, as soon as it receives from time base BT (FIG. 1) the signal IN, supplies the first row of the matrix with interrogation current. The procedure for enabling this row to receive that current has been set forth with reference to FIG. 5.

As a response to the interrogation current, all cores $N(1,1) \ldots N(1,n+1)$ (FIG. 1) of the interrogated row emit at the same time, over the respective wires of both links 2A and 2B, a response signal whose form depends upon the state of the core itself, namely upon the presence or absence of a current on conductors $C_{1,1} \ldots C_{m,n}$ which form the writing windings of these cores.

Reference will be made hereinafter only to the signals which are handled in the control unit or section CMA connected to link 2A, as the treatment simultaneously given to the signals carried by link 2B is exactly the same.

The responses emitted by all cores of the row are amplified and brought to the proper logic value by the corresponding amplifier AS1,...AS(n+1) (FIG. 2). At the instant defined by the transition to 1 of signal CK3 (FIG. 4), the responses from cores $N(1,1) \ldots N(1,n)$ (FIG. 1) are loaded into buffer register RPP (FIG. 2) which has the task of keeping such signals during the whole row time. The response of core $N(1,n+1)$ (FIG. 1) is, however, loaded into test unit CIR (FIG. 3).

At an instant subsequent to the transition from 0 to 1 of signal CK3 (FIG. 4) the resetting current, which—as already stated—does not produce signals on wires 4(1) ... 4(N+1) (FIG. 2), is sent into cores $N(1,1), \ldots N(1,n+1)$ (FIG. 1).

In this phase the clock signal CK4 is at 1 (FIG. 4); therefore, multiplexer MX1 (FIG. 2) will be positioned at its inputs connected to wires 5(1)... 5(n), and transfers in parallel to multiplexer MX2 over wires 6(1)... 6(n) the data signals relative to the cores of the first row of the matrix.

Multiplexer MX2 scans its inputs successively, by means of signal CK5, thus serializing over wire 8 the responses emitted by cores $N(1,1), \ldots N(1,n)$ (FIG. 1), i.e. the samples of the current levels present on writing conductors $C_{1,1} \ldots C_{1,n}$ correlated to the monitored signaling circuits.

These samples are stored in parity generator GP (FIG. 2) and at the same time sent to transducer TL for the required level conversion. These operations are repeated in an identical way with each cycle for the other m−1 rows of cores equipped with writing windings to that at the end of row time TRm (FIG. 4) the serialized samples of current levels present on the monitored circuits will be available on link 3A (FIG. 2) in a form directly usable by processor DU.

At the beginning of row time TR(m+1) (FIG. 4) the passage to 0 of signal CK4 positions multiplexer MX1 (FIG. 2) at its inputs connected to link 7; thus it is no longer possible to transfer to processor DU, through components RPP and MX1, the signals emitted by amplifiers AS1, ... AS(n+1), which are instead transferred into test unit CAS (FIG. 3); the output signal of amplifier AS(n+1) (FIG. 2) is further supplied, as in the previous cycles, to test unit CIR (FIG. 3). In that row time TR(m+1), units CAS and CIR carry out checks in the way described with reference to FIG. 3, and the result of these checks appears as a supervisory signal on wire 9 (FIG. 2) at the end of the cycle.

The transition to 0 of signal CK4 (FIG. 4) enables generator GP (FIG. 2) to calculate the parity on the information signals received up to that moment and to emit over wire 11 a bit indicative of such a parity.

While signal CK4 is at 0, multiplexer MX1 sends in parallel to multiplexer MX2 a number of supervisory signals, namely: the parity bit relative to the information signals sent to processor DU in the cycle under consideration, such a bit being present on wire 11; the signals with a fixed logic value present on link 13 (FIG. 1), required by processor DU to estimate the transmission quality on link 3A; the signals sent back by the processor over wire 12A; and finally the bit indicative of the result of the checks carried out by network CC during the preceding cycles, this bit being present on wire 9 at the start of the cycle by virtue of the transition to 1 of signal W6 (FIG. 4).

At the end of cycle A, processor DU receives over links 3A and 3B a word which is sent serially and consists of a first part of n·m information bits, each corresponding to one of the circuits to be scanned, and of a second part of m check and self-diagnosis bits.

At instant $t_B$ (FIG. 4) the signal CK1 changes from 1 to 0; thus, interrogation circuit IR (FIG. 2) of section CMA is disabled and the corresponding circuit of section CMB (FIG. 1) is enabled, whereas all the other components of sections CMA and CMB continue to operate simultaneously.

From the above description, it will be apparent that no unit of the duplicated logic networks of the detector DR is constantly kept in a standby position, and thus a continuous check of the operation of those networks is made possible.

Furthermore, the serializing of the data outgoing from the magnetic-core sensors, by virtue of which it is sufficient to use only one wire to send these data to the processor, makes it possible to locate the detector in the most suitable place for signal detection without requiring an extension of the monitored circuits to a point close to the processor or a connection of the detector to the logic networks through several groups of wires.

I claim:

1. In a telecommunication system including a multiplicity of signaling circuits carrying data represented by the presence or absence of direct current thereon,
the combination therewith of a detector for monitoring the state of conduction of said signaling circuits, comprising:
an orthogonal matrix of active and passive magnetic-core sensors divided into a multiplicity of rows and columns, said active sensors being provided with writing conductors connected to respective signaling circuits to be monitored;

substantially identical first and second control sections each including scanning means having outgoing leads coacting with the sensors of respective rows for transmitting interrogation and resetting currents to the sensors of each row during respective time intervals of a recurrent scanning cycle, each of said control sections further including amplifier means having incoming leads coacting with the sensors of respective columns for reading the states thereof in the presence of an interrogation current;

a processor connected to receive information signals from said amplifier means of both control sections indicative of the states of the interrogated active sensors detected in each scanning cycle;

test means in each of said control sections with inputs connected to said amplifier means thereof for receiving responses from passive sensors of said matrix, devoid of writing conductors, during interrogation thereof;

timing means connected to said control sections for enabling the respective scanning means of said first and second control sections during alternate cycles and enabling the test means of both control sections during phases of each cycle reserved for the interrogation of said passive sensors; and switchover means controlled by said timing means for transmitting supervisory signals from said test means of both control sections to said processor in lieu of information signals during a portion of each cycle in which no active sensors of said matrix are being interrogated.

2. The combination defined in claim 1 wherein said matrix consists of $(m+1)$ rows and $(n+1)$ columns, said active sensors being located in m rows and n columns, said psssive sensors occupying one row and one column, said amplifier means comprising an individual amplifier for each column.

3. The combination defined in claim 2 wherein said test means in each of said control sections comprises a first test unit, enabled by said timing means during a phase reserved for the interrogation and resetting of said one row to make a comparison among binary output signals from said amplifiers, and a second test unit connected only to the amplifier of said one column for making a comparison between the output signal thereof and a predetermined signal level during each time interval, said test units emitting error signals in the event of an unsuccessful comparison.

4. The combination defined in claim 3 wherein each of said control sections further comprises first and second storage means respectively connected to said first and second test units thereof for receiving the results of said comparisons carried out in a plurality of consecutive cycles and generating a malfunction indication only in response to error signals received in all said consecutive cycles.

5. The combination defined in claim 3 wherein said second test unit has a blocking input connected to an output of said first test unit for inhibiting the emission of an error signal by said second test unit in the presence of an error signal from said first test unit.

6. The combination defined in claim 3 wherein said one row is the $(m+1)^{th}$ row of the matrix receiving interrogation and resetting currents during a final phase of each scanning cycle, said timing means being operative to enable said first test unit twice during said final phase for comparing the output signals of said amplifiers once in the presence of interrogation current and again after resetting.

7. The combination defined in claim 1 wherein the scanning means of each of said control sections comprises a pair of switching circuits with a multiplicity of wire pairs forming part of said outgoing leads at opposite ends of each row, said switching circuits being concurrently operable by said timing means to establish a flow path for interrogation current in one direction, including one wire of each pair at opposite ends of any row, and a flow path for resetting current in the other direction, including the other wire of each pair of said opposite ends.

8. The combination defined in claim 7 wherein said rows are divided into a multiplicity of groups, each wire pair of one of said switching circuits having parallel branches traversing all the rows of a respective group, each wire pair of the other of said switching circuits being connected in parallel to the branches traversing homologous rows of all groups, said branches being electrically separated from one another by decoupling means inserted between said wire pairs and said branches at said opposite ends.

9. The combination defined in claim 8 wherein said decoupling means comprises a set of diodes.

10. The combination defined in claim 2 wherein said one row is the last row scanned in each cycle, further comprising a buffer register controlled by said timing means and connected to the amplifiers of said n columns for receiving information signals from the active sensors of each of said m rows during the corresponding time intervals, and a multiplexer connected between said buffer register and said processor for serially reading out the received information signals under the control of said timing means during each of said corresponding time intervals, said switchover means being inserted between said buffer register and said multiplexer for connecting the latter to said test means during a final time interval of each cycle reserved for the scanning of the $(m+1)^{th}$ row.

* * * * *